No. 640,878. Patented Jan. 9, 1900.
M. S. CURLEY.
MEANS FOR HARVESTING COTTON.
(Application filed Apr. 29, 1899.)
(No Model.)
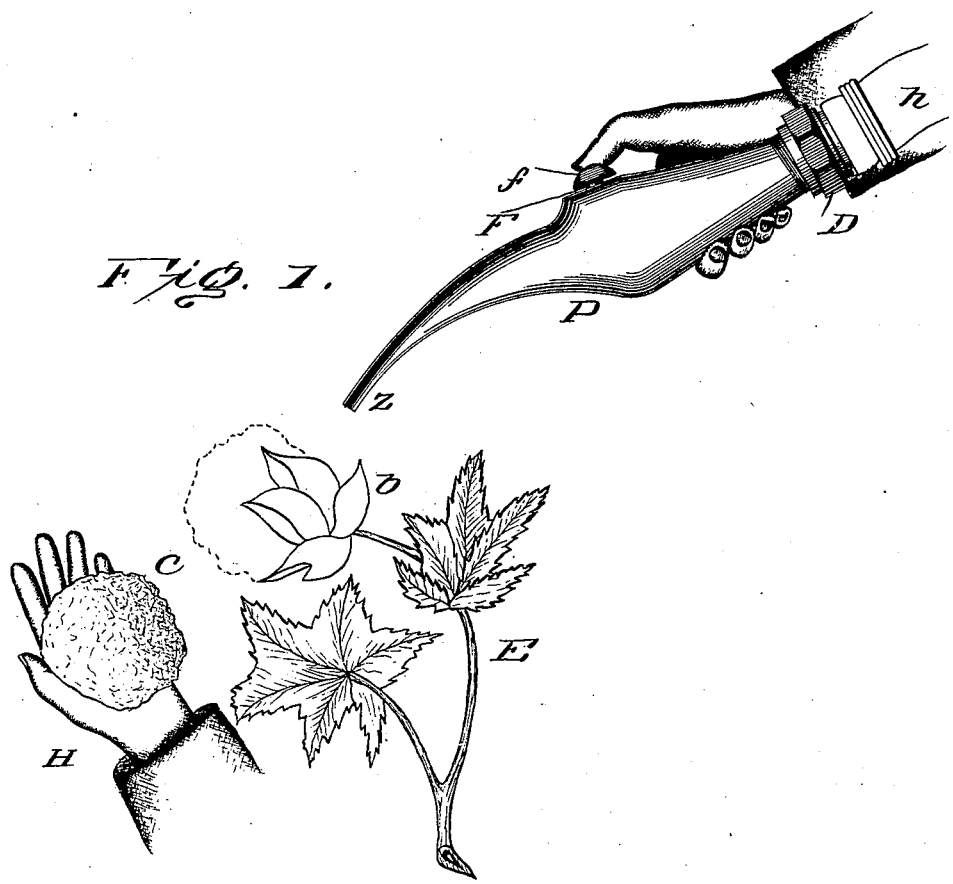
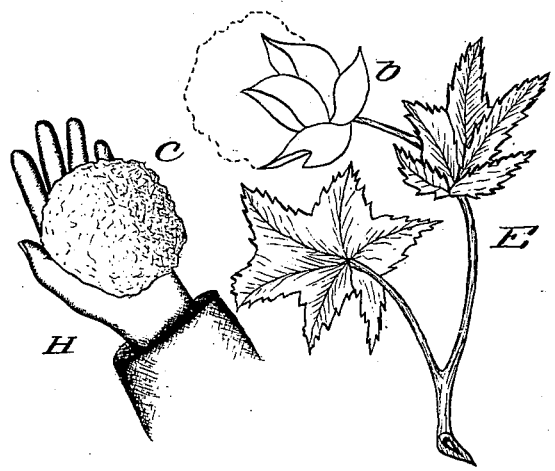
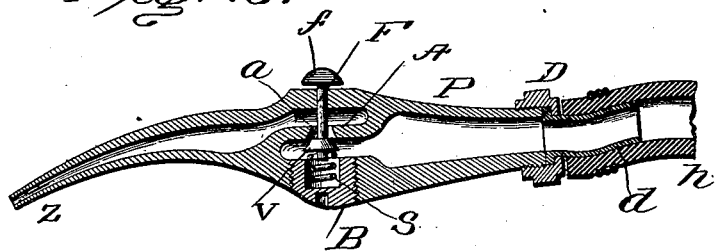
Witnesses
Inventor
Michael S. Curley.
by R.S.&A.B. Lacey
his Attorneys.

UNITED STATES PATENT OFFICE.

MICHAEL S. CURLEY, OF PADUCAH, KENTUCKY.

MEANS FOR HARVESTING COTTON.

SPECIFICATION forming part of Letters Patent No. 640,878, dated January 9, 1900.

Application filed April 29, 1899. Serial No. 715,020. (No model.)

*To all whom it may concern:*

Be it known that I, MICHAEL S. CURLEY, a citizen of the United States, residing at Paducah, in the county of McCracken and State of Kentucky, have invented certain new and useful Improvements in Means for Harvesting Cotton; and I do hereby declare the following to be a full, clear, and exact description of the invention, such as will enable others skilled in the art to which it appertains to make and use the same.

This invention relates to means for harvesting cotton by directing a blast of air against it in such a manner as to dislodge the cotton from the boll and carry it to a receiver disposed in the path of the air-blast.

In order to illustrate the invention in its simplest form, the hand of the cotton-picker is shown as the means for catching the cotton and intercepting the blast, it being understood that any suitable device or contrivance may be resorted to and substituted for the human hand.

For a full disclosure of the invention and the merits thereof and also to acquire a knowledge of the details of construction of the means for effecting the result reference is to be had to the following description and the drawings hereto attached.

As previously stated, any form of apparatus may replace that shown. Therefore in practicing the invention it is to be understood that various changes in the form, proportion, and minor details of construction may be resorted to without departing from the spirit or sacrificing any of the advantages of the invention.

In the drawings, Figure 1 shows the particular application of the invention. Fig. 2 is a longitudinal section of the valve-nozzle.

Corresponding and like parts are referred to in the following description and indicated in all the views of the drawings by the same reference characters.

The cotton-plant is indicated by the reference-letter E, the boll by $b$, and the cotton by $c$. The human hand H is shown extended and in the path of the current or blast of air, so as to receive the cotton when dislodged from the boll.

In harvesting or gathering cotton in accordance with this invention a blast or jet of air is directed against the cotton $c$ in such a manner as to dislodge it from the boll and carry it away from the plant. The catcher, which in the present instance is the human hand, is located in the path of the air and cotton, so as to intercept the latter and prevent it from being blown away. The cotton when collected is placed in a receptacle (not shown) accompanying the picker in the ordinary manner. The blast of air is derived from an air plant, compressor, or storage-receptacle, as may be found most advantageous, and is conveyed to the point of discharge by means of a flexible tube or hose-pipe $h$, the latter being provided at its delivery end with a nozzle P, having a valve under the control of the picker, so as to shut off the air and prevent wasting when moving the nozzle from one boll to another.

The nozzle P has its middle portion expanded or swelled and its delivery end tapering and contracted, as shown at Z, and curved longitudinally for convenience in handling and direction of the blast against the plant. The nozzle is attached to the hose-pipe $h$ by means of a coupling $d$ and a union D, the latter making screw-thread connection with the rear end of the nozzle. A diaphragm or partition A subdivides the bore or passage of the nozzle and extends from one wall to the other and is provided centrally with an opening or valve-seat $a$, which is normally closed by a valve V, which is held seated by a coil-spring S, interposed between the valve V and a plug B, the latter being in line with the valve and its stem and threaded into an opening in the lower side of the body of the nozzle. This plug B is formed in its outer end with a slot to receive a screw-driver or like tool by means of which the plug can be secured in or out to vary the tension of the spring S. The inner end of the plug is chambered and receives the spring S. The valve-stem F operates through an opening formed in the top side of the body of the nozzle and is provided at its outer end with a button $f$, upon which the thumb or finger of the hand obtains a purchase when pressing upon the stem to unseat the valve. The plug B admits of access to the interior of the nozzle when it is required to position the valve and spring or to remove the same for any desired purpose, and the valve-seat $a$ is trued by means of a tool thrust through the opening closed by the part B.

The plug B is of uniform diameter throughout its length and can be screwed into the opening closed thereby, so as to bring its outer end flush with the side of the nozzle or within the opening and its inner end against the valve V should it be required to secure said valve upon its seat against opening.

In the practical operation of the invention the hose-pipe or tube $h$ is connected with a suitable source for supplying air under pressure, and after the nozzle has been positioned so as to direct a blast of air against the cotton $c$ the valve V is unseated by pressure exerted upon the valve-stem in the manner described. After the cotton has been dislodged from a boll and received by the catcher the pressure is removed from the valve-stem and the blast of air cut off by the valve V automatically seating itself by the action of the spring S in regaining itself. The tension of the spring S can be varied so as to permit the unseating of the valve by the application of a comparatively-slight pressure upon the valve-stem. The construction is such as to obviate the wasting of air when moving the nozzle from one boll to another.

Having thus described the invention, what is claimed as new is—

1. A pneumatic harvester for cotton, comprising a handpiece adapted to be attached at its rear end to a flexible air-blast conductor and being of length sufficient to be held in the hand of the operator and provided at its front end with a downcurved tapering nozzle, a longitudinal air-passage intercepted by a partition having a valve-seat located at or near the junction of the handpiece and nozzle, a threaded opening of uniform diameter in line with the valve-seat, a stemmed valve coöperating with the valve-seat and having its stem projecting through the opposite wall of the handpiece in line with said threaded opening, a spring for holding the valve seated, and a plug threaded into the said opening and having a recess in its inner end to receive the spring, said plug being of uniform diameter throughout and adapted to regulate the tension of the spring and to be turned up against the valve to hold it from unseating when pressing upon the valve-stem, substantially as described.

2. A pneumatic harvester for cotton, comprising an elongated handpiece of proper length to be firmly grasped and held in the hand of the operator and adapted to be attached at its rear end to a flexible air-blast conductor and provided at its front end with a downcurved tapering nozzle, and a valve having an exterior operating device and located at or near the junction of the handpiece and nozzle for regulating the passage of air therethrough.

In testimony whereof I affix my signature in presence of two witnesses.

MICHAEL S. CURLEY. [L. S.]

Witnesses:
W. F. JONES,
NAT. J. BROOKS.